Dec. 16, 1941.   F. D. JONES   2,266,606

PATROL STICK

Filed April 19, 1941

Inventor:
Frederick D. Jones,
By W. W. Williamson
Attorney.

Patented Dec. 16, 1941

2,266,606

UNITED STATES PATENT OFFICE 2,266,606

PATROL STICK

Frederick D. Jones, Philadelphia, Pa.

Application April 19, 1941, Serial No. 389,307

5 Claims. (Cl. 273—84)

My invention relates to a new and useful patrol stick, such as used by police officers, the armed forces of a government while on peace patrol duty and other law enforcement persons, and usually referred to as a police club, night stick and the like.

One of the objects of the invention is to provide a patrol stick having means incorporated as a part thereof to cause pain to anyone attempting to grab and wrest the stick from the person holding and wielding the same.

Another object of the invention is to provide a patrol stick with a number of normally covered barbs that will be uncovered automatically due to the pressure applied to the stick by anyone grabbing the same.

A further object of the invention is to provide a patrol stick having at least one row of barbs extending any desirable length of the stick body and protruding beyond the outer circumference of said stick body and normally housed in a retractable sheath so as to be uncovered for pricking a person's hand when the stick is grasped with the force usually necessary to prevent wielding thereof.

A still further object of the invention is to provide a patrol stick such as outlined above with a manually operable barb at the outer extremity of the stick body to be unsheathed by the wielder of the stick should anyone grab the terminal end thereof.

With the above and other objects in view, this invention consists of the details of construction and combination of elements hereinafter set forth and then designated by the claims.

In order that those skilled in the art to which this invention appertains may understand how to make and use the same, I will describe one embodiment thereof in detail, referring by numerals to the accompanying drawing forming a part hereof, in which.

Figure 1:
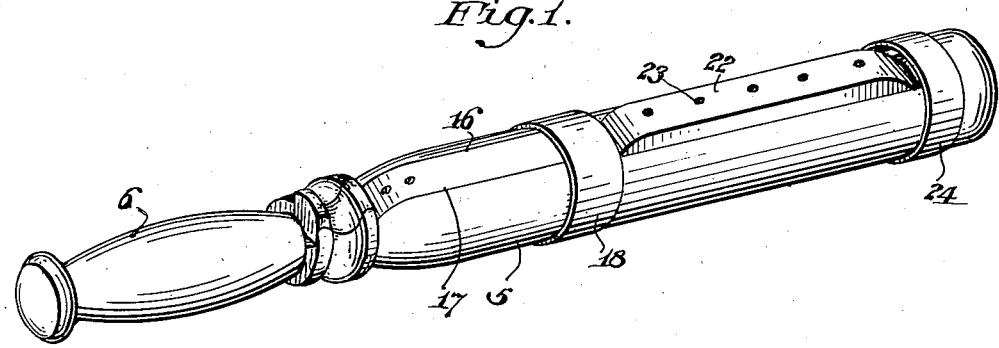
Fig. 1 is a perspective view of a patrol stick embodying my invention.
Figure 2:
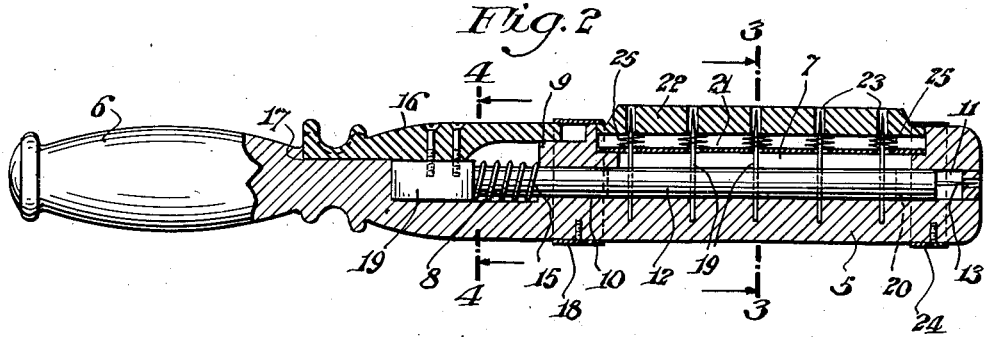
Fig. 2 is a longitudinal sectional view thereof with a portion of the handle and some of the featured elements shown in elevation.
Figure 4:
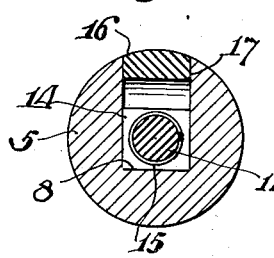
Fig. 4 is a section on the line 4—4 of Fig. 2.
Figure 3:
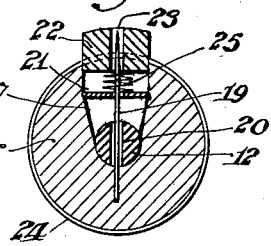
Fig. 3 is a section on the line 3—3 of Fig. 2.

In carrying out the invention as herein embodied 5 represents the body of the patrol stick and 6 the handle thereof. In the outer end portion of said body is formed a longitudinally disposed chamber 7 of any suitable and desirable length. The length of this chamber 7 is limited only by the necessity of having space for certain attachments at the terminal end of the body and sufficient room at the inner end of said body for the formation of a second but shorter chamber 8 to receive the head of a plunger or rod and a spring to be presently described.

These two chamber are separated from each other by a partition 9 having a hole 10 therethrough communicating with both chambers and through the terminal end of the body leads a bore 11 of two diameters, the larger diameter being at the inner end thereof.

A rod 12 extends from the shorter chamber 8 through the hole 10 in the partition 9 and the longer chamber 7 into the larger part of the bore 11 and is longitudinally slidable with the outer end of said rod normally lying spaced from the shoulder formed by the differences in diameter of said bore. The outer end of said rod 12 carries a barb 13 for projection through the smaller part of the bore 11 to unsheath said barb when the rod is moved outwardly.

Within the shorter chamber 8 is an enlargement or head 14 carried by the inner end of the rod 12 which is urged towards its retracted position by a spring 15 engaging said head and the partition 9. The rod 12 is protracted manually against the action of the spring 15 through the medium of a finger piece 16 formed as a segment of the patrol stick and fashioned to correspond to the contour of said patrol stick. This finger piece is set into a groove 17 that might be said to extend across the shorter chamber 8 longitudinally of the patrol stick with which chamber 8 said groove communicates and said finger piece is attached to the rod 12 and more particularly the head 14 thereof. By fashioning and mounting the finger piece as above described its outer surfaces are normally flush with contiguous surfaces of the stick body and handle.

To prevent anything from entering that portion of the groove 17 in the region of the partition and in front of the finger piece 16 so as to hinder the protraction of the rod 12 and its barb 13, a ring or band 18 is placed about the stick body in a position to cover the normally open portion of the groove. Naturally this ring or band assists in holding the finger piece in place and also has another purpose as will be apparent from the description below.

In the body of the stick are mounted a plurality of radial barbs 19 preferably positioned in a row longitudinally of the stick body and spaced from one another a less distance than the width of a person's fingers to eliminate the possibility of the fingers entering between adjacent barbs 19 without contacting the sharpened or pointed ends thereof. These barbs 19 project through the longer chamber 7 and protrude therefrom beyond the line of the circumference of the stick body and where said barbs are positioned in the axis of the chamber 7, the rod 12 has a slot 20 to accommodate the row of barbs which project therethrough. Said slot is of sufficient length to permit longitudinal movement of the rod without interference.

A removable wall or spring rest 21 is mounted in the chamber 7 and is supported by shoulders, one at each end of the chamber 7 and this wall or spring rest is apertured, for the projection of the barbs 19.

Beyond the wall or rest 21 within the chamber 7 is mounted a sheath 22 having a portion slightly longer than the row of barbs 19 protruding beyond the line of the circumference of the stick body a sufficient distance to enclose the outer or pointed ends of said row of barbs 19 and having holes 23 to register with all of the barbs.

One end of said sheath underlies a portion of the ring or band 18 and the other end underlies a ledge which, for purposes of illustration, is shown as provided by a ring or band 24 surrounding the stick body at the outer end of the longer chamber 7. Obviously an equivalent ledge can be formed as an integral part of the stick body.

The sheath 22 is urged outwardly by springs 25, two or more of which can be employed and where two are used they are located so there is one adjacent each end of said sheath and a convenient way to retain them in place is to position them about the barbs 19. These springs engage the wall or rest 21 as the stationary element and the sheath as the movable element so that said sheath is always forced outwardly.

During the time the patrol stick is employed as a defense weapon should anyone, either a lawbreaker or a confederate, attempt to prevent use of the stick by grabbing the same in the region of the sheath 22, the latter will be pressed inward or retracted thereby exposing the barbs 19 so they will stick into or prick the hand or fingers to cause sufficient pain to make him release his hold therefrom. As soon as pressure is withdrawn from the sheath 22 it will be returned to its normal position, to cover the barbs 19, by means of the springs 25.

Anyone knowing of the arrangement of the barbs 19 and grasping the terminal end of the stick can be made to release his grip thereon by the wielder of the stick pushing on the finger piece 16. This will unsheath the barb 13 and cause said barb to prick the hand producing sufficient pain to make the lawbreaker unconsciously withdraw his hand. When the pressure on the finger piece is relieved the spring 15 will return the parts to their normal positions and retract the barb 13.

Of course I do not wish to be limited to the exact details of construction herein shown and described, as these may be varied within the scope of the appended claims without departing from the spirit of my invention.

Having described my invention, what I claim as new and useful is:

1. A patrol stick including a body and handle, said body having a chamber opening to the surface thereof, barbs in said chamber projecting radially therefrom beyond the line of the circumference of the body, and a spring actuated apertured sheath slidably mounted in said chamber and normally covering said barbs which will be exposed upon retraction of the sheath due to pressure applied to said sheath.

2. A patrol stick including a handle and a longitudinally recessed body, a partition dividing the recess into inner and outer chambers lengthwise of the stick and having a hole therethrough communicating with said chambers, the terminal end of the body having a bore of two different diameters with the larger portion inside and in endwise alignment with the hole through the partition, a slidably mounted rod extending from the inner chamber and through the hole in the partition and through the outer chamber and into the larger part of the bore, a head on the inner end of said rod, a spring between the head and partition to normally retract the rod, a barb on the outer end of said rod and sheathed while the rod is in its retracted position and adapted to be projected through the smaller portion of the bore when said rod is protracted, and means connected with the rod whereby said rod may be manually protracted.

3. The structure in claim 2 wherein the stick has a longitudinal groove in its surface communicating with the inner chamber and the means whereby the rod may be manually operated is a finger piece slidably mounted in said groove, in combination with means to cover the normally open end of said groove.

4. A patrol stick including a handle and a longitudinally recessed body, a partition dividing the recess into inner and outer chambers lengthwise of the stick and having a hole therethrough communicating with said chambers, the terminal end of the body having a bore of two different diameters with the larger portion inside and in endwise alignment with the hole through the partition, a slidably mounted rod extending from the inner chamber and through the hole in the partition and through the outer chamber and into the larger part of the bore, a head on the inner end of said rod, a spring between the head and partition to normally retract the rod, a barb on the outer end of said rod and sheathed while the rod is in its retracted position and adapted to be projected through the smaller portion of the bore when said rod is protracted, a finger piece forming a segment of the stick slidably mounted in a groove in said stick which groove crosses the inner chamber lengthwise of the stick and communicates with the inner chamber, said finger piece being connected to the head of the rod, a plurality of barbs mounted in the body of the stick and projecting radially through the outer chamber so as to protrude beyond the line of the outer circumference of the body, said barbs being arranged in a row and extending through a longitudinal slot in the rod and individual barbs spaced from one another a distance less than the width of a person's fingers, an apertured spring rest in the outer chamber spaced from the rod, an apertured sheath mounted in the outer chamber with a portion protruding beyond the line of the circumference of the stick body for covering the protruding ends of the radially extending barbs, springs between the spring rest and sheath to urge the latter outward, said sheath to be retracted when the stick is grasped by a person other than the wielder thereof, means of overhanging ledge formation to limit the outward movement of the outer end of said sheath and means on the stick body and overlapping the inner end of said sheath to limit the outward movement of said inner end of the sheath and also overlapping the adjacent end of the finger piece and covering a normally exposed portion of the groove in which the finger piece is mounted.

5. A patrol stick including a body and handle with a chamber adjacent said handle and provided with a groove communicating with said chamber, a rod extending from said chamber to a point adjacent the terminal end of the body and mounted for longitudinal sliding movements, a barb on the outer end of said rod for projection through a bore at said terminal end of the body, a head on the inner end of the rod within the chamber, a spring having one end engaging a wall of the chamber and the other end engaging the head to urge the rod to a retracted position and thereby sheath the barb, and a finger piece formed as a segment of the stick and corresponding to the shape of that part of the stick out of which the groove is formed, said finger piece being slidably mounted in the groove and connected to the head to permit manual operation of the rod for projecting the barb.

FREDERICK D. JONES.